United States Patent
Lindemuth et al.

(10) Patent No.: US 6,808,011 B2
(45) Date of Patent: Oct. 26, 2004

(54) HEAT PIPE SYSTEM FOR COOLING FLYWHEEL ENERGY STORAGE SYSTEMS

(75) Inventors: James E. Lindemuth, Lancaster, PA (US); Brian E. Mast, Lancaster, PA (US); Nelson J. Gernert, Elizabethtown, PA (US); James L. Smith, Jr., Lititz, PA (US); John J. Todd, Jr., Elizabethtown, PA (US)

(73) Assignee: Thermal.Corp., Stanton, DE (US)

( * ) Notice: Subject to any disclaimer, the term of this patent is extended or adjusted under 35 U.S.C. 154(b) by 217 days.

(21) Appl. No.: 09/964,303

(22) Filed: Sep. 26, 2001

(65) Prior Publication Data

US 2003/0056936 A1 Mar. 27, 2003

(51) Int. Cl.[7] .................................................. F26D 1/00
(52) U.S. Cl. ..................... 165/45; 165/140.26; 165/122; 165/260
(58) Field of Search ........................ 165/44, 104, 26, 165/122, 260

(56) References Cited

U.S. PATENT DOCUMENTS

| | | | | |
|---|---|---|---|---|
| 3,828,845 A | * | 8/1974 | Waters .................... | 165/45 |
| 3,902,547 A | * | 9/1975 | Waters .................... | 165/45 |
| 3,935,900 A | * | 2/1976 | Waters .................... | 165/45 |
| 4,162,701 A | | 7/1979 | Ollendorf ................. | 165/32 |
| 4,345,642 A | * | 8/1982 | Ernst et al. .............. | 165/86 |
| 4,388,964 A | | 6/1983 | Almgren et al. .......... | 165/32 |
| 4,921,063 A | * | 5/1990 | Masuda .................. | 180/178 |
| 4,982,274 A | * | 1/1991 | Murase et al. ........... | 357/82 |
| 5,587,880 A | * | 12/1996 | Phillips et al. ........... | 361/687 |
| 5,705,018 A | | 1/1998 | Hartley ................... | 165/345 |
| 6,463,755 B2 | * | 10/2002 | Schulak et al. .......... | 62/440 |
| 6,595,269 B2 | * | 7/2003 | Mitchell .................. | 165/86 |
| 6,631,755 B1 | * | 10/2003 | Kung et al. .............. | 165/46 |
| 6,674,640 B2 | * | 1/2004 | Pokharna et al. ........ | 361/687 |
| 6,675,872 B2 | * | 1/2004 | Lewis et al. ............. | 165/10 |
| 2003/0066381 A1 | * | 4/2003 | Lewis et al. ............. | 74/572 |

FOREIGN PATENT DOCUMENTS

| | | |
|---|---|---|
| EP | 0 779 436 A2 | 6/1997 |
| JP | 57 022440 A2 | 2/1982 |
| JP | 61 294223 A2 | 12/1986 |

* cited by examiner

Primary Examiner—Henry Bennett
Assistant Examiner—Nihir Patel
(74) Attorney, Agent, or Firm—Duane Morris LLP

(57) ABSTRACT

A system for cooling a canister has first, second and third heat pipes. The first heat pipe has an evaporator and a condenser. The first heat pipe is mounted with its evaporator inside the canister and its condenser outside the canister. The second heat pipe has an evaporator conductively coupled to the condenser of the first heat pipe. The second heat pipe has a condenser. The third heat pipe has an evaporator conductively coupled to the condenser of the second heat pipe. The third heat pipe has a condenser with a plurality of fins on the condenser of the third heat pipe.

20 Claims, 6 Drawing Sheets

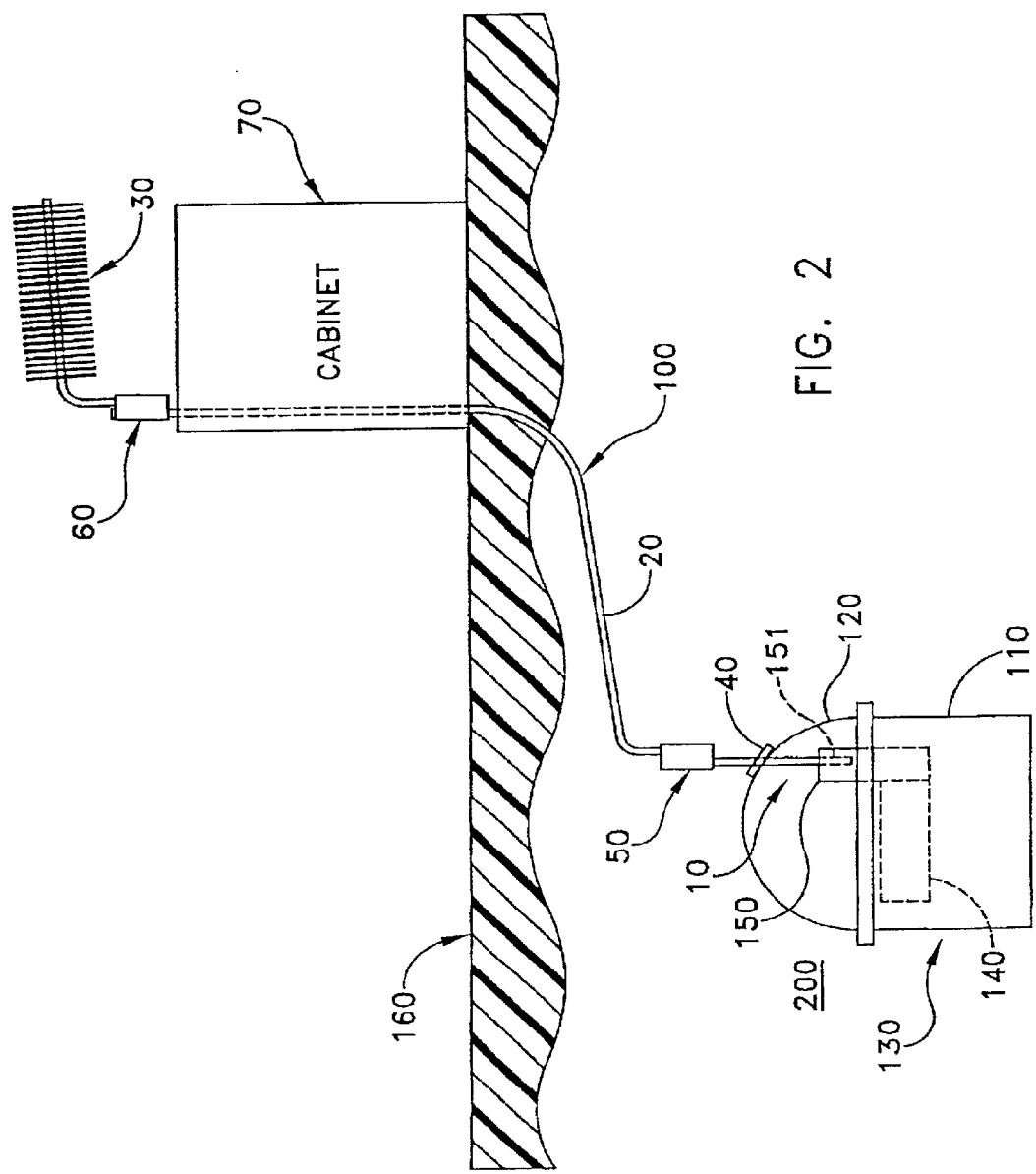

HEAT PIPE SYSTEM FOR COOLING FLYWHEEL ENERGY STORAGE SYSTEMS

FIELD OF THE INVENTION

The present invention relates to cooling systems generally, and more specifically to heat pipe systems.

BACKGROUND OF THE INVENTION

Flywheel systems are used for energy storage in backup power supplies (e.g., for telecommunication systems, server farms, etc.). Energy is stored in the angular momentum of the flywheel. The flywheel systems are typically stored inside silo canisters, and these canisters can be located above or below ground. Typical prior-art flywheel systems dissipated a sufficiently small amount of waste heat that the canister could be cooled by passive conduction from the canister to the exterior.

Newer flywheel systems dissipate too much power in the form of heat to cool the flywheels by conduction alone.

SUMMARY OF THE INVENTION

The present invention is a cooling system 100 that brings heat from inside a flywheel 140 to the exterior where it is dissipated by one or more means. The cooling system 100 comprises one or more heat pipes that transfer the heat to the exterior of the flywheel and those heat pipes dissipated the heat to various heat sinks.

Another aspect of the invention is a system comprising: a first heat pipe having an evaporator and a condenser. The first heat pipe is mounted with the evaporator inside the canister and the condenser outside the canister. A second heat pipe has an evaporator thermally coupled to the condenser of the first heat pipe. The second heat pipe has a condenser. Means are provided for dissipating heat from the condenser of the second heat pipe.

Another aspect of the invention is a system comprising: a flywheel stored within a canister; and a heat pipe having an evaporator and a condenser. The heat pipe is mounted with the evaporator inside the canister and the condenser abutting a wall of the canister.

According to another aspect of the invention, a system is provided for cooling a canister, the system comprising first, second and third heat pipes. The first heat pipe has an evaporator and a condenser. The first heat pipe is mounted with its evaporator inside the canister and its condenser outside the canister. The second heat pipe has an evaporator thermally coupled to the condenser of the first heat pipe. The second heat pipe has a condenser. The third heat pipe has an evaporator thermally coupled to the condenser of the second heat pipe. The third heat pipe has a condenser with a heat dissipation mechanism thereon.

BRIEF DESCRIPTION OF THE DRAWINGS

FIG. 2 is a side elevation view of a flywheel energy storage system including the cooling system of FIG. 1.

DETAILED DESCRIPTION

Figure 1:
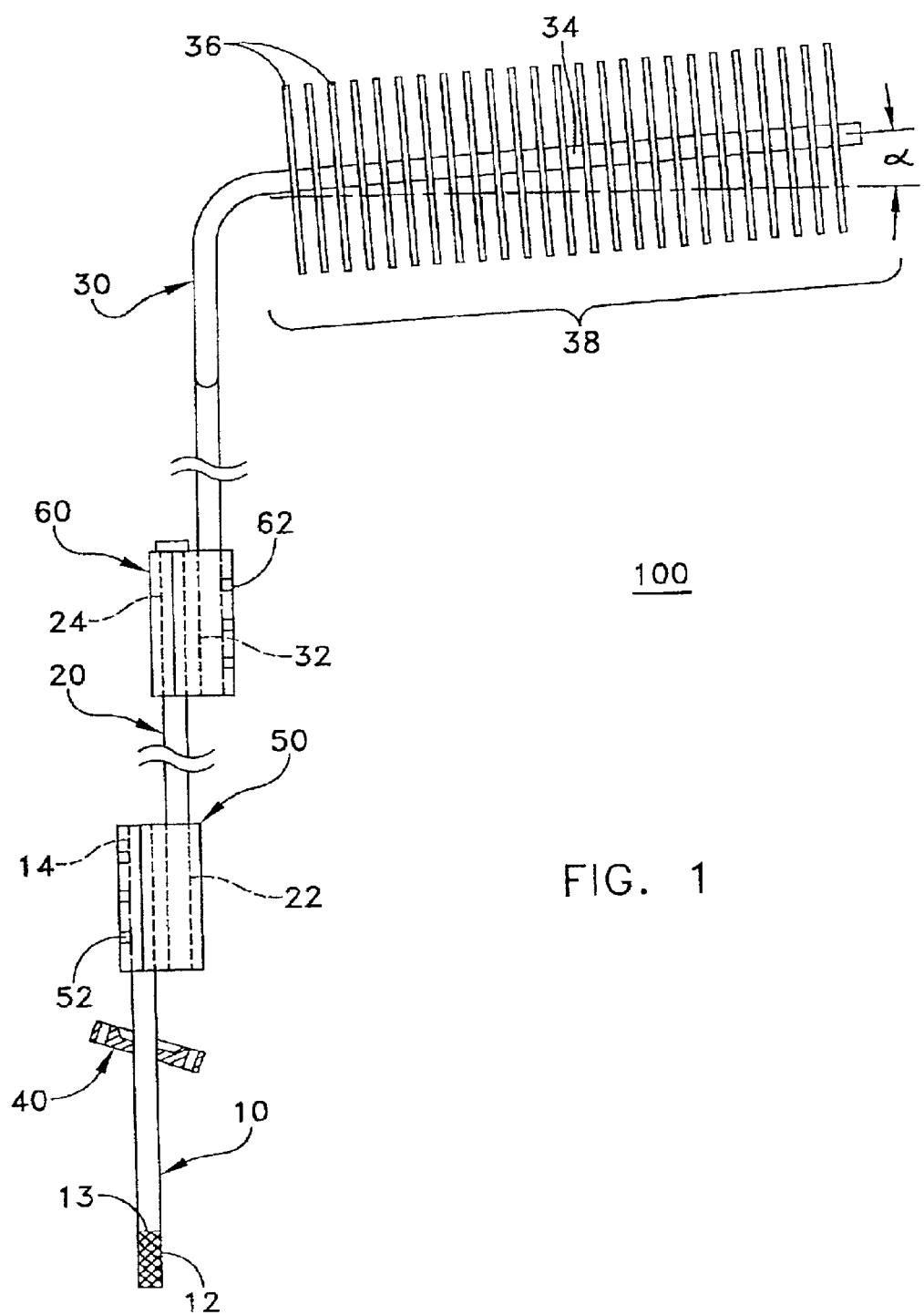
FIG. 1 is a side elevation view of an exemplary cooling system according to the present invention.

The present invention is a system 100 for cooling a canister 130. In the exemplary embodiment, the canister 130 is the silo of a flywheel energy storage system 200 that is partially buried or completely buried about 60 to 240 centimeters below the surface 160 of the ground. Canister 130 is a vacuum housing. Canister 130 has an energy storage flywheel having a motor housing 140 mounted inside the canister. It is contemplated that system 100 may be used for cooling other types of canisters that have internal heat sources. It is also contemplated that system 100 may be used for cooling canisters that are located above the surface 160 of the ground.

The system 100 includes a first heat pipe 10, a second heat pipe 20 and a third heat pipe 30. The first heat pipe 10 has an evaporator 12 and a condenser 14. The first heat pipe 10 is mounted with its evaporator 12 inside the canister 200 and its condenser 14 outside the canister. The first heat pipe 10 is mounted to the motor housing 140 within the canister 130. In the exemplary system 100, the first heat pipe 10 is positioned entirely below the ground surface 160, but it is contemplated that the first heat pipe 10 could be positioned partially above the ground surface 160, or entirely above the ground surface.

The second heat pipe 20 has an evaporator 22 conductively coupled to the condenser 14 of the first heat pipe 10. The second heat pipe 20 has a condenser 24. The exemplary second heat pipe 20 is a thermosyphon. A thermosyphon is a heat pipe that uses gravity to return fluid from the condenser 24 to the evaporator 22 thereof. The exemplary second heat pipe 20 is partially buried below the ground surface 160, and partly above the ground surface. It is contemplated that the second heat pipe 20 could be positioned entirely below the ground surface 160, or entirely above the ground surface.

The third heat pipe 30 has an evaporator 32 conductively coupled to the condenser 24 of the second heat pipe 20. The third heat pipe 30 has a condenser 34 with a plurality of fins 36 thereon. The exemplary fins 36 are thirty-four circular aluminum plate fins arranged in a fin stack 38. Fins having other shapes and/or number of fins are contemplated. The exemplary third heat pipe 30 is completely above the ground surface 160, but it is contemplated that the evaporator 32 of heat pipe 30 could be located at or below ground level. The evaporator 32 of the exemplary third heat pipe 30 is oriented substantially vertically, and the condenser 34 of the third heat pipe is at a substantial angle (90—α) away from vertical. The angle α of the condenser 34 of the third heat pipe 30 is at least about 5 degrees from horizontal. As an alternative to fins 36, an extruded heat sink (not shown) may be mounted on the condenser 34 of the third heat pipe 30.

The heat may be rejected by finstack 38 to the atmosphere by natural convection. Alternatively, forced convection may be used. An exemplary system transports 60 Watts of power from the flywheel system, with a temperature difference of about 10–12 degrees Centigrade between the canister 130 and the ambient temperature. Other power levels and/or temperature differences are also contemplated.

In the exemplary embodiment, all three of the heat pipes 10, 20 and 30 have wicks formed of sintered metal, such as copper, for example. In heat pipe 10, the wick 13 only is present in the evaporator section 12. The wick does not extend beyond the evaporator 12 into the condenser 14. FIG. 1 only shows the wick 13 of heat pipe 10, but the wicks of heat pipes 20 and 30 may be configured similarly. The wick 13 may have a cross section in the shape of an I-beam, or other wick shapes may be used. Because heat pipe 10 is vertical, heat pipe 20 rises continuously without any local maximum, and the condenser 34 of heat pipe 30 is at least 5 degrees from the horizontal, gravity returns the condensed fluid to the evaporators 12, 22, 32 without the need for wicks in the condensers 14, 24, 34.

In the exemplary embodiment, all three of the heat pipes use methanol as the working fluid. Other known working fluids may be used.

As shown in FIG. 2, the first heat pipe 10 is mounted within a block 150 of metal having a hole therethrough to receive the heat pipe. The block 150 is mounted to the flywheel system 140. For example, the block 150 may have a cylindrical bore 151 sized to receive the heat pipe 10. The block 150 can be cut in half, along a plane passing through the center of the bore 151, to easily mount the heat pipe 10 within the bore. A conventional thermal interface material (e.g., thermal grease, or thermally conductive adhesive) may be placed on the inner surface of the bore 151 to ensure good conduction between block 150 and heat pipe 10 throughout the surface of the bore 151. The two halves of the block 150 may be fastened together by conventional fastening means.

FIG. 2 shows a seal 40 where the first heat pipe 10 passes through the dome 120 of canister 130. In the exemplary embodiment, the seal is a "CONFLAT®" style flange, such as those manufactured by Varian, Inc. of Palo Alto, Calif. This type of flange provides a reliable, all-metal, leak-free seal over a wide range of temperatures. Alternatively, similar flanges made by other manufacturers, or other types of seals known to those of ordinary skill may be used.

Figure 4:
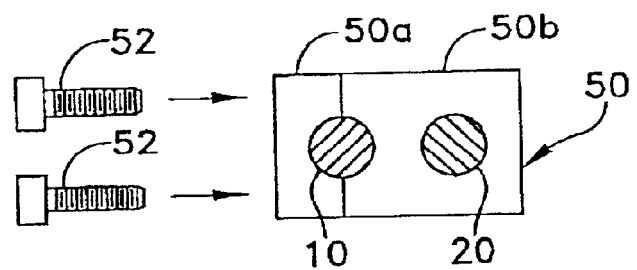
FIG. 4 is a plan view of the thermocoupling shown in FIG. 3.
Figure 3:
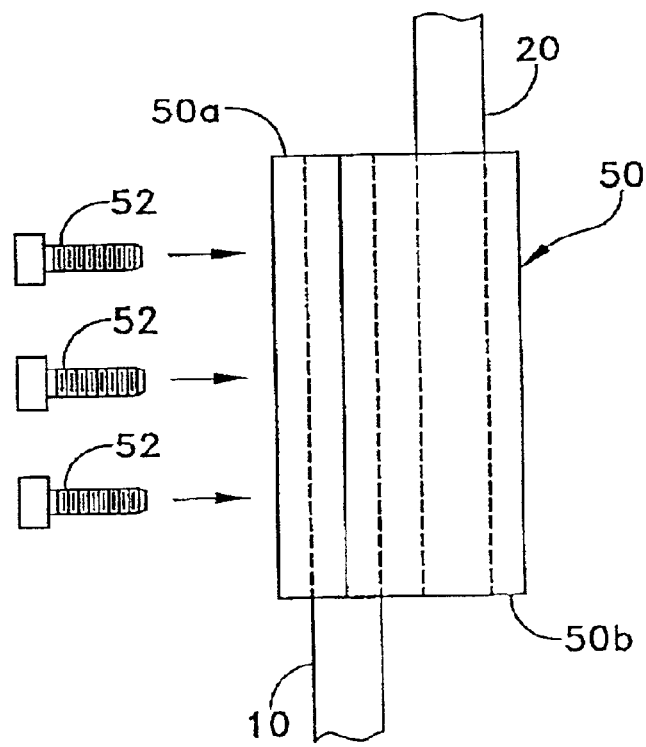
FIG. 3 is an enlarged detail of the thermocoupling device shown in FIG. 1.

System 100 includes two thermocoupling devices 50 and 60. FIGS. 3 and 4 show the couplings 50, 60 in detail. In the exemplary embodiment, each coupling 50, 60 comprises a metal block (e.g., copper or aluminum) having a pair of cylindrical bores therethrough. The first bore of thermocoupling 50 receives the condenser 14 of heat pipe 10, and the second bore of thermocoupling 50 receives the evaporator 22 of heat pipe 20. The block 50 is split into two pieces 50a, 50b, with one of the bores split in half across the two pieces. A thermal interface material (e.g., solder, thermal grease or thermally conductive adhesive is applied to provide good conduction between the heat pipe 10 and the thermocoupling 50. In the exemplary embodiment, the second heat pipe 20 is soldered into thermocoupling 50. Clamping fasteners (e.g., screws) 52 hold the two portions 50a, 50b of coupling 50 together. Alternatively, the block 50 may be split along a plane of symmetry into two halves, so that each bore is divided in half.

Similarly, the first bore of thermocoupling 60 receives the condenser 24 of heat pipe 20, and the second bore of thermocoupling 60 receives the evaporator 32 of heat pipe 30. The block 60 is split in two portions, with one (or each) bore divided in half. A thermal interface material (e.g., thermal grease or thermally conductive adhesive is applied to provide good conduction between the heat pipe 20 and the thermocoupling 60. Heat pipe 30 is soldered to the bore of thermocoupling 60. Clamping fasteners 62 hold the two portions of coupling 60 together. The coupling 60 may be split as shown in FIGS. 3 and 4, or split along the axis of symmetry through both bores.

Although the exemplary thermocouplings 50, 60 are cylindrical, thermocouplings 50 and 60 may have other shapes, such as a parallelepiped (block) shape.

Thermocouplings 50, 60 have a sufficient length to achieve a desired temperature difference ($\Delta T$). For example, experiments have indicated that a $\Delta T$ of about 3.25 degrees centigrade is achieved between the condenser of heat pipe 10 and the evaporator of heat pipe 20 using a thermocoupling 50 about 10 centimeters long. Thus, the $\Delta T$ from the two thermocouplings 50, 60 combined accounted for about 50% of the total $\Delta T$ between the motor housing 140 and the ambient. Other thermocoupling lengths are contemplated, ranging from about 5 centimeters to about 20 centimeters.

In the exemplary embodiment, the second heat pipe 20 passes through a cabinet 70, which may be a flywheel electronics module (FEM) cabinet. The cabinet 70 can provide support for the second heat pipe 20, if heat pipe 20 extends a long distance above the ground. Alternative support structures for heat pipe 20 are also contemplated.

The heat pipe system 100 operates passively, eliminating maintenance and reliability concerns. This makes the exemplary system 100 advantageous for use in areas that are remote from maintenance workers.

Although the exemplary heat pipe system has three heat pipes a similar design may include only a single heat pipe. The evaporator of the single heat pipe would penetrate the canister below ground and a condenser with a fin stack or extrusion would be positioned above ground.

It is also contemplated that systems may be constructed with any number of two or more heat pipes. For example, there may be a single thermocoupling, which may be positioned above or below ground. Alternatively, additional heat pipes and thermocouplings may be interposed between the first and second (or second and third) heat pipes. For example, an additional thermocoupling and fourth heat pipe may be used to thermally couple the second and third heat pipes. Thus, configurations including four, five or more heat pipes are also contemplated.

Although the exemplary embodiment includes a finstack, further variations of the exemplary embodiment are contemplated. These may include, for example, use of heat pipes to bring the heat inside the flywheel to the exterior of the canister, to be dissipated by interfacing to one or more heat dissipating means. The heat dissipating means may include heat sinks such as the ambient air, a pumped water loop, the surrounding ground, a phase change energy storage material, or the like.

For example, the various heat sinks could be ambient air, the ground 160 (if the canister 200 is buried) or some other cooling medium such as pumped water-cooling or energy storage medium for example. Either way, the heat pipe(s) are the conduit to transfer the heat to the heat sink. After the heat is transferred to the exterior to the canister 200, the selection of the appropriate cooling method is dependent upon many parameters such as geographical location, surrounding temperatures, availability of water, and whether the canister 200 is above or below ground. When below ground, one exterior cooling approach uses heat pipes in a spider like array leading away from the canister 200 which dissipates the heat to surrounding soil/aggregate. Separate heat storage mediums can be substituted without changing the cooling system. These heat storage mediums can be below ground or above ground. When the heat is brought to the surface for dissipation, one or more heat pipes can be used as described above.

Figure 5:
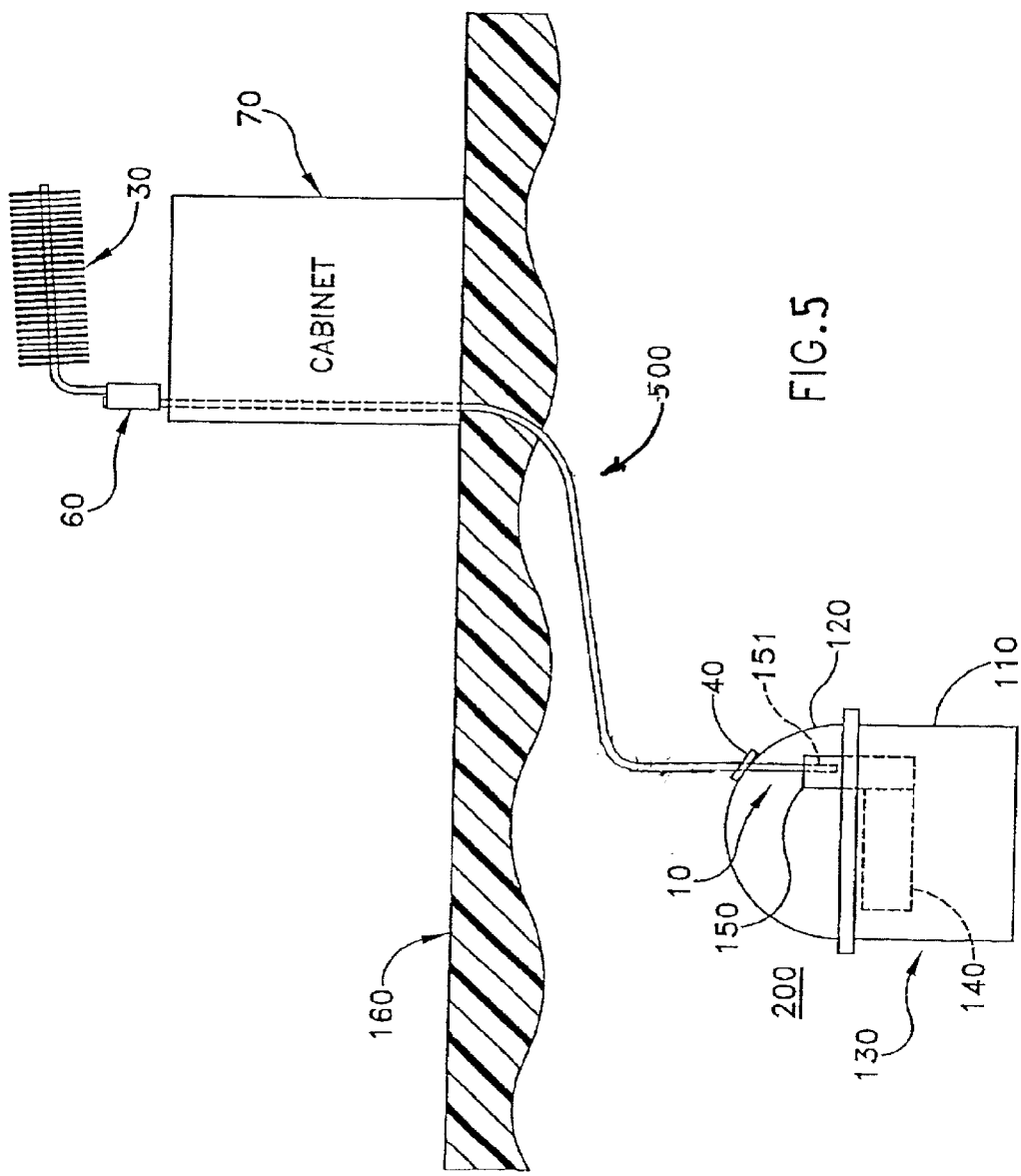
FIG. 5 is a side elevation view of a second exemplary cooling system according to the present invention.

FIG. 5 shows a second exemplary system 500. The system has two heat pipes 10 and 30. Heat pipe 10 has its evaporator inside the canister 200, and its condenser outside of the cabinet. Heat pipe 30 has a condenser with a heat dissipation means, such as a fin stack. There is a single thermocoupling 60 connecting heat pipes 10 and 30. Thermocoupling 60 may be below or above ground. Other items in system 500 are the same as system 100, and a description thereof is not repeated.

Figure 6:
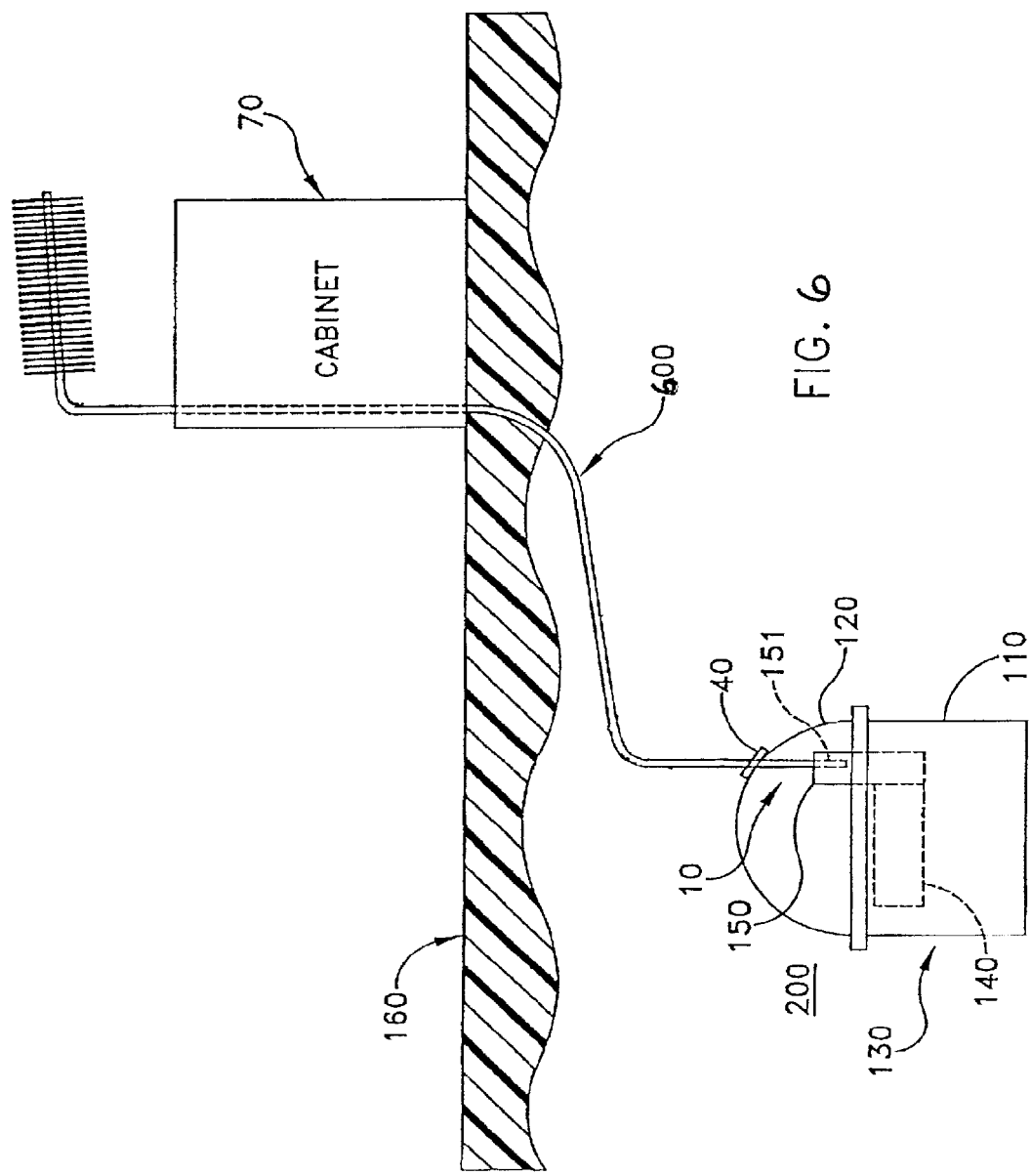
FIG. 6 is a side elevation view of a third exemplary cooling system according to the present invention.

FIG. 6 shows a third exemplary system 600. The system has one heat pipe 10. Heat pipe 10 has its evaporator inside the canister 200, and its condenser outside of the cabinet. Heat pipe 10 has a condenser with a heat dissipation means, such as a fin stack. Other items in system 600 are the same as system 100, and a description thereof is not repeated.

Figure 7:
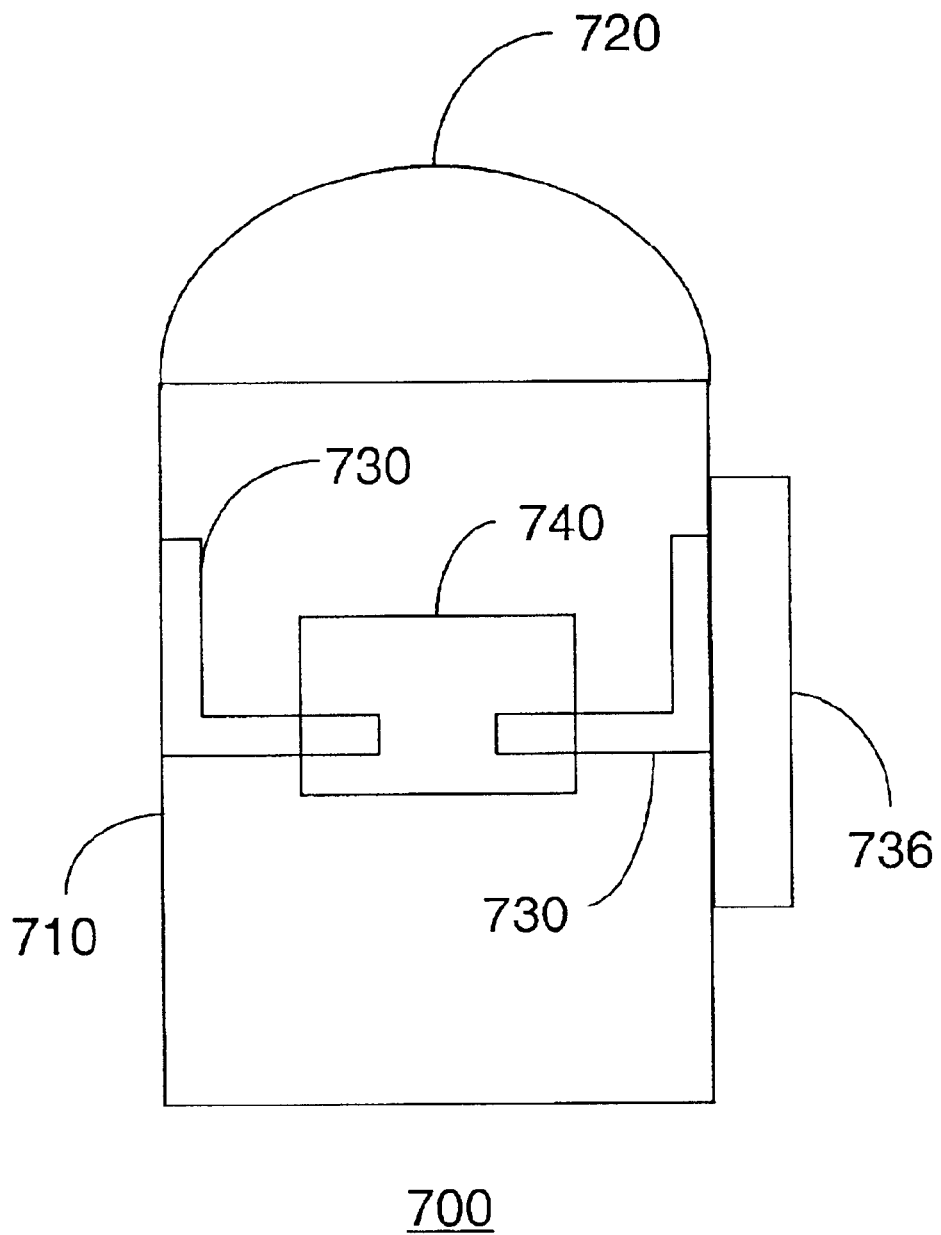
FIG. 7 is a side elevation view of a fourth exemplary cooling system according to the present invention.

FIG. 7 shows a fourth exemplary system 700. In system 700, one or more heat pipes 730 transfer heat from the flywheel 740 to a wall 710 of the canister. The canister wall 710 spreads the heat and conducts heat to the surroundings (which may be ground, air, or both). Preferably, the heat pipe 730 abuts the inside wall 710 of the canister, as shown in FIG. 7. Alternatively, the heat pipe 730 may penetrate the wall 710 or dome 720 of the canister and abut the outside of the wall or dome (not shown). To increase the heat transfer capacity, additional heat pipes 730 may be added to maintain a desired flywheel temperature. Alternatively, the dimension of the heat pipes 730 may be increased to provide more heat transfer. Because heat pipes 730 are relatively short, it is not necessary to use thermosyphon return of fluid to the evaporator. Thus, heat pipes 730 may be of any configuration, and may include wicks to transport liquid from the condenser to the evaporator. One or more heat sinks 736 may be mounted to the exterior of canister wall 710 to enhance dissipation of heat from the canister 710. The heat sink 736 may be of any design, including folded fins or any other extended heat transfer surface.

Although the invention has been described in terms of exemplary embodiments, it is not limited thereto. Rather, the appended claim should be construed broadly, to include other variants and embodiments of the invention, which may be made by those skilled in the art without departing from the scope and range of equivalents of the invention.

What is claimed is:

1. A system for cooling a canister, comprising:
    a first heat pipe having an evaporator and a condenser, the first heat pipe being mounted with the evaporator inside the canister and the condenser outside the canister; wherein the canister is at least partially buried below ground, and the first heat pipe is positioned entirely below a ground surface;
    a second heat pipe having an evaporator thermally coupled to the condenser of the first heat pipe, the second heat pipe having a condenser;
    a third heat pipe having an evaporator thermally coupled to the condenser of the second heat pipe, the third heat pipe having a condenser; and
    means for dissipating heat from the condenser of the third heat pipe.

2. The system of claim 1, wherein the second heat pipe is partially buried below the ground surface, and partly above the ground surface.

3. The system of claim 1, wherein the third heat pipe is completely above the ground surface.

4. The system of claim 1, wherein the second heat pipe is a thermosyphon.

5. The system of claim 1, wherein the evaporator of the third heat pipe is oriented substantially vertically, and the condenser of the third heat pipe is at a substantial angle away from vertical.

6. The system of claim 5, wherein the angle of the condenser of the third heat pipe is at least about 5 degrees from horizontal.

7. The system of claim 1, wherein the first heat pipe is mounted to a motor housing of a flywheel system within the canister.

8. The system of claim 7, wherein the first heat pipe is mounted within a block of metal having a hole therethrough to receive the heat pipe, the block being mounted to the flywheel system.

9. The system of claim 1, wherein the canister is a vacuum housing.

10. The system of claim 1, wherein the heat dissipating means including a plurality of circular fins arranged in a fin stack.

11. The system of claim 1, wherein at least one of the heat pipes has a wick in the evaporator thereof that does not extend into the condenser thereof.

12. The system of claim 1, wherein at least one of the heat pipes has a wick formed of sintered metal.

13. An energy storage system, comprising:
    a canister,
    an energy storage flywheel having a motor housing mounted inside the canister;
    a first heat pipe having an evaporator and a condenser, the evaporator of the first heat pipe, being mounted to the motor housing, the condenser of the first heat pipe outside the canister;
    a second heat pipe having an evaporator conductively coupled to the condenser of the first heat pipe, the second heat pipe having a condenser;
    a third heat pipe having an evaporator conductively coupled to the condenser of the second heat pipe, the third heat pipe having a condenser interfacing to a heat dissipating means.

14. The system of claim 13, wherein the second heat pipe is a thermosyphon.

15. The system of claim 13, wherein the evaporator of the third heat pipe is oriented substantially vertically, and the condenser of the third heat pipe is at a substantial angle away from vertical.

16. The system of claim 15, wherein the angle of the condenser of the third heat pipe is at least about 5 degrees from horizontal.

17. The system of claim 13, wherein the canister is a vacuum housing.

18. The system of claim 13, wherein the heat dissipating means include circular fins arranged in a fin stack.

19. The system of claim 13, wherein at least one of the heat pipes has a wick in the evaporator thereof that does not extend into the condenser thereof.

20. The system of claim 13, wherein at least one of the heat pipes has a wick formed of sintered metal.

* * * * *